(12) United States Patent
Sivaramalingam et al.

(10) Patent No.: US 11,973,991 B2
(45) Date of Patent: Apr. 30, 2024

(54) PARTIAL LOADING OF MEDIA BASED ON CONTEXT

(71) Applicant: International Business Machines Corporation, Armonk, NY (US)

(72) Inventors: Balamurugaramanathan Sivaramalingam, Paramakudi (IN); Sathya Santhar, Ramapuram (IN); Samuel Mathew Jawaharlal, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 16/599,359

(22) Filed: Oct. 11, 2019

(65) Prior Publication Data

US 2021/0112292 A1 Apr. 15, 2021

(51) Int. Cl.
*H04N 21/231* (2011.01)
*H04L 65/80* (2022.01)
*H04N 21/2662* (2011.01)
*H04N 21/845* (2011.01)

(52) U.S. Cl.
CPC ....... *H04N 21/23106* (2013.01); *H04L 65/80* (2013.01); *H04N 21/2662* (2013.01); *H04N 21/845* (2013.01)

(58) Field of Classification Search
CPC ......... H04N 21/23106; H04N 21/2662; H04N 21/845; H04L 65/80
See application file for complete search history.

(56) References Cited

U.S. PATENT DOCUMENTS

| 6,766,407 | B1 | 7/2004 | Lisitsa et al. |
| 7,007,295 | B1 * | 2/2006 | Rose ............... H04N 7/165 345/419 |
| 7,558,869 | B2 | 7/2009 | Leon et al. |
| 7,783,075 | B2 | 8/2010 | Zhang et al. |

(Continued)

FOREIGN PATENT DOCUMENTS

| CN | 101588493 A | 11/2009 |
| WO | 2007036032 W | 4/2007 |

OTHER PUBLICATIONS

Bertini et al., "Content-based Video Adaptation with User's Preferences," https://www.academia.edu/21940019/Content-based_video_adaptation_with_users_preferences, © 2004 IEEE, pp. 1-4.

(Continued)

*Primary Examiner* — Boris D Grijalva Lobos
*Assistant Examiner* — Timothy Sowa
(74) *Attorney, Agent, or Firm* — Haley J. McClory

(57) ABSTRACT

A processor may initiate a recording. The processor may segment the recording into one or more segments. The processor may determine, based on the identification of a primary object in a first segment of the recording, a first bit rate for the first segment of the first recording. The processor may preload one or more subsequent segments that include the primary object at the first bit rate. The processor may preload each of the one or more subsequent segments with a secondary object at a second bit rate. The second bit rate may be lower than the first bit rate. The processor may display the recording to the user.

17 Claims, 6 Drawing Sheets

(56) References Cited

U.S. PATENT DOCUMENTS

| | | | | | |
|---|---|---|---|---|---|
| 8,752,113 | B1* | 6/2014 | Good | | H04N 21/2662 |
| | | | | | 725/116 |
| 11,076,084 | B2* | 7/2021 | O'Donnell | | H04N 7/185 |
| 2003/0052906 | A1* | 3/2003 | Lau | | G06F 3/0481 |
| | | | | | 715/700 |
| 2004/0125877 | A1 | 7/2004 | Chang | | |
| 2007/0005795 | A1* | 1/2007 | Gonzalez | | H04N 19/186 |
| | | | | | 709/232 |
| 2007/0286520 | A1* | 12/2007 | Zhang | | H04N 7/147 |
| | | | | | 382/264 |
| 2008/0133766 | A1 | 6/2008 | Luo | | |
| 2009/0019178 | A1 | 1/2009 | Melnyk et al. | | |
| 2010/0167816 | A1* | 7/2010 | Perlman | | H04N 19/132 |
| | | | | | 463/30 |
| 2012/0179742 | A1* | 7/2012 | Acharya | | G08G 1/0175 |
| | | | | | 709/202 |
| 2013/0063442 | A1* | 3/2013 | Zaman | | G06T 11/40 |
| | | | | | 345/441 |
| 2013/0073981 | A1* | 3/2013 | Pea | | G06F 16/9558 |
| | | | | | 715/751 |
| 2014/0193032 | A1* | 7/2014 | Zhang | | G06T 3/0012 |
| | | | | | 382/103 |
| 2014/0215536 | A1* | 7/2014 | Maxwell | | H04N 19/119 |
| | | | | | 725/87 |
| 2015/0120883 | A1* | 4/2015 | Gurtowski | | H04N 21/632 |
| | | | | | 709/219 |
| 2016/0088054 | A1* | 3/2016 | Hassan | | H04N 21/26258 |
| | | | | | 709/219 |
| 2017/0358145 | A1* | 12/2017 | Heinz | | H04N 21/6582 |
| 2018/0103199 | A1* | 4/2018 | Hendry | | H04N 21/21805 |
| 2019/0116101 | A1* | 4/2019 | Harb | | H04L 43/08 |
| 2020/0077132 | A1* | 3/2020 | Sivaramalingam | | |
| | | | | | H04N 21/2662 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

PARTIAL LOADING OF MEDIA BASED ON CONTEXT

BACKGROUND

The present disclosure relates generally to the field of media content streaming, and more specifically to automatically preloading specific segments of media content at different bit rates.

Many video hosting websites and social networking sites allow users to view video content online through online video streaming processes instead of allowing the users to download the video content. Existing video streaming technologies, such as adaptive bit streaming, split a video file into multiple segments and encode the video content in multiple bit rates. The video content is then delivered to a user at a bit rate that is based solely on real-time client network speed.

SUMMARY

Embodiments of the present disclosure include a method, computer program product, and system for automatically preloading specific segments of media content at different bit rates. A processor may initiate a recording. The processor may segment the recording into one or more segments. The processor may determine, based on the identification of a primary object in a first segment of the recording, a first bit rate for the first segment of the first recording. The processor may preload one or more subsequent segments that include the primary object at the first bit rate. The processor may preload each of the one or more subsequent segments with a secondary object at a second bit rate. The second bit rate may be lower than the first bit rate. The processor may display the recording to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
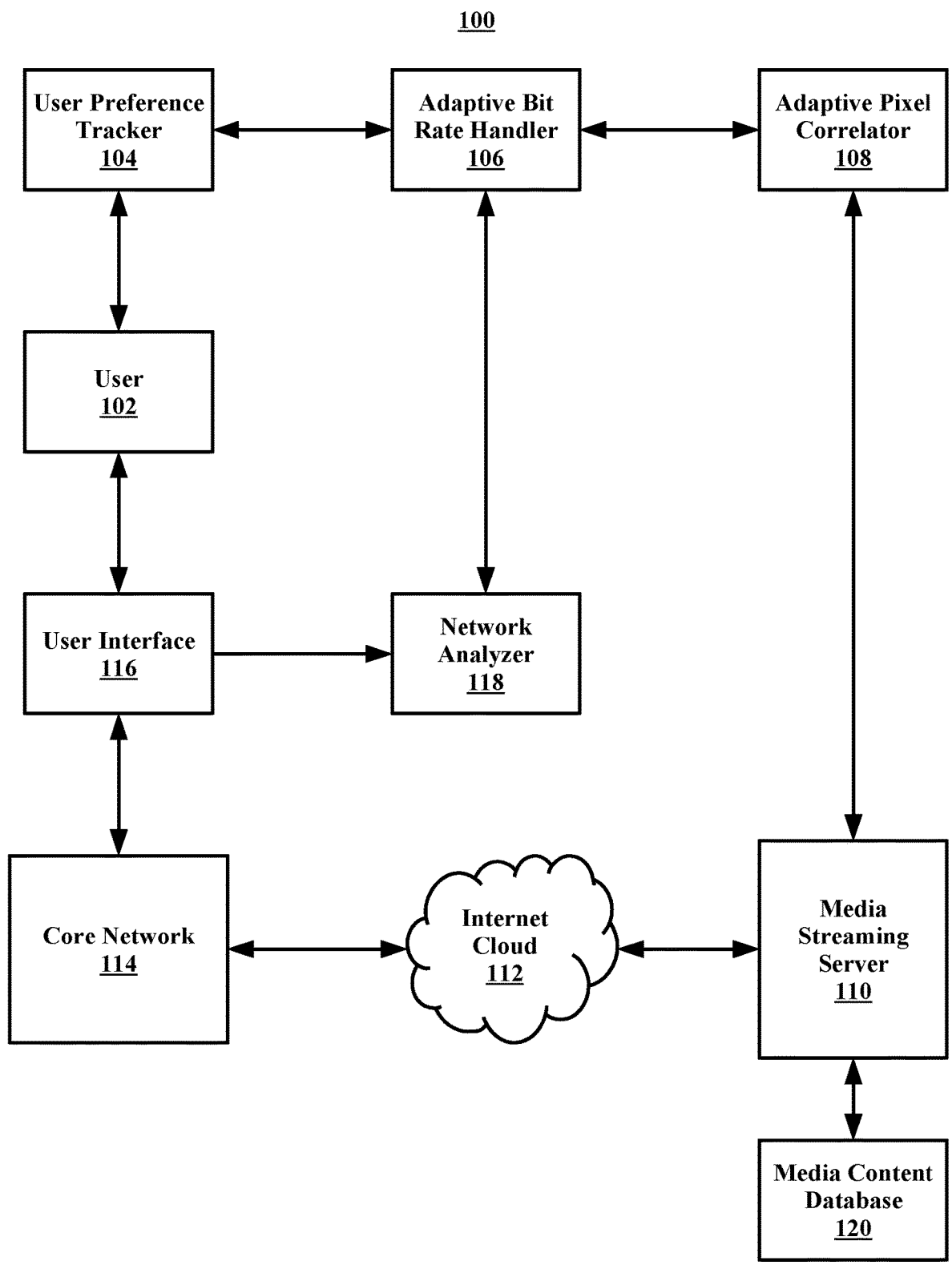
FIG. 1 illustrates an example system for automatically determining a bit rate to display segments of a recording to a user, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of media content streaming, and more specifically to automatically preloading specific segments of media content at different bit rates. While the present disclosure is not necessarily limited to such applications, various aspects of the disclosure may be appreciated through a discussion of various examples using this context.

Many video hosting websites and social networking sites allow users to view video content online through video streaming processes instead of allowing the users to download the video content. Further, most users prefer to watch video content online (e.g., through streaming) as opposed to downloading the video content to a local machine (e.g., smartphone, tablet, computer, etc.). Existing video streaming technologies, like adaptive bit streaming, split a video file into multiple segments and encode the video content from the video file into multiple bit rates (e.g., high, medium, and low quality versions of the video content). The video content is then delivered at a determined bit rate that is based solely on the real-time client network speed.

For instance, whenever a client system indicates a network speed change, the media streaming server chooses the next segment with the appropriate bit rate and delivers the next segment at that chosen bit rate (e.g., network speed is slow so send the next segment in low quality and vice-a-versa, etc.). Current technologies also ensure that an entire video file does not need to be streamed before it is viewed so that the user will not incur unnecessary bandwidth consumption charges. In order to save such bandwidth, the media streaming server delivers a small number of upcoming video segments in addition to the current segments consumed by the media player.

However, there are certain issues associated with current video streaming technologies. For instance, when network speed is low, and if a user prefers to view their media in high resolution, the only available option is to wait for each media frame to be loaded and then watch. This can lead to unquantifiable waiting that consumes the user's (e.g., viewer's) time and also blemishes the user's viewing experience.

Further still, even if an entire video is downloaded at higher resolution, a user might only be interested in a specific object, or specific objects, in a frame and therefore many other objects in the frame (e.g., like a fan running in the background, furniture in the background, or people standing behind a main character, etc.), which are of no interest to the user consume bandwidth to be download with the same resolution as the specific object. Currently, there is no technique (e.g., method, system, etc.) in place that can load user-interested objects from each frame in high quality to allow the user to continue watching media content instead of waiting indefinitely for entire frames to be loaded in a uniform high quality as the user-interested object(s).

When network speed changes, even if the client notifies the media server, the bit rate could be changed by the media server only for the video segments that are yet to be transferred and not for the already transferred video segments. This might not be an issue if the network speed gets downgraded, but it would be an issue if the network speed increased. For instance, if a user wants to view a scene again (e.g., replay a scene) after network speed has increased, a first segment of the scene in a high quality (e.g., high resolution, high bit rate, etc.) and a second segment of the scene in a low quality, would both now be delivered by the media server at a high bit rate, which leads to bandwidth wastage due to the first segment already being at a high quality.

Further, in certain cases, a user with a higher bandwidth network might stop viewing media content at a current scene or choose to jump to a future scene from the current scene (e.g., skipping the current scene and/or scenes in-between the current scene and the future scene). In such a case, all the streamed/preloaded upcoming media segments of the current scene (and/or in-between scenes) that are of high quality would be of no use (as they are being skipped over), which would result in bandwidth wastage.

In other instances, a user might be interested in streaming an entire media content immediately (e.g., due to various reasons such as limited time to high speed network access) and desire to watch it later (e.g., starting a video and immediately pausing it to let it buffer, etc.). In such a case, only a small number of upcoming media segments from the current scene are delivered to the user. This would effectively force the user to be connected to/in the high speed network in order to view the entire content streamed in high quality.

There are no existing video streaming technologies that address bandwidth consumption issues raised due to varying network conditions and/or a user's real time intentions associated with the media content as discussed above. As such a user may desire an avenue to solve such issues.

In some embodiments, a processor may initiate a recording. The processor may segment the recording into one or more segments. The processor may determine, based on the identification of a primary object in a first segment of the recording, a first bit rate for the first segment of the recording. The processor may preload one or more subsequent segments that include the primary object at the first bit rate. The processor may preload each of the one or more subsequent segments with a secondary object at a second bit rate. The second bit rate may be lower than the first bit rate. The processor may display the recording to a user.

For example, a user may begin playing a video on a tablet. The tablet may begin streaming the video, and before displaying the video to the user, the tablet may segment the video and/or scenes of the video into specific segments. This may allow the tablet to more effectively stream and process the video. Further the tablet may identify from the segments that a reoccurring figure keeps appearing in multiple segments. The tablet may designate/tag the reoccurring figure (e.g., a main character, etc.) as a primary object in the video.

The tablet may then determine that the reoccurring object should be visible (e.g., quality-wise, resolution-wise, etc.) during each segment of the video so that the user can understand the videos story/instructions/etc. The tablet may then preload segments with the reoccurring figure at a high quality, and any segments without the reoccurring figure at a lower quality. The tablet would then display the recording to the user with the reoccurring figure at the high quality and the segments without the reoccurring figure at the lower quality. This allows for faster loading and streaming of the video as opposed to waiting for the video to buffer enough to stream ever segment of the recording at high quality.

It is noted that segments as used herein is not meant to be limiting and could mean a portion, a scene, a frame, etc. of a recording. For instance, a segment could mean a time-stamped portion of a recording, e.g., images within 10 second timeframes, etc. In other instances, a segment could mean a one or more portions within the same timeframe, scene, etc. For example, a primary object could be in the same portion of a recording as a non-primary (e.g., secondary) object and within that same portion, the processor could preload the primary object at a first bit rate and the non-primary objects at a second bit rate, as will be discussed in further detail in regard to FIG. 2B.

Further, it is noted that the second bit rate could be lower than the first bit rate, but could also, in some embodiments, be the same as the first bit rate. For example, if the processor determines there is enough bandwidth to preload each segment at the same, high quality without interfering with the time to load the recording, the processor may load each segment at the same bit rate (e.g., the first bit rate and the second bit rate are the same).

In some embodiments, segmenting the recording into the one or more segments may comprise the processor analyzing the recording. The processor may identify, from the analyzing, two or more objects in the recording. The processor may select from the two or more objects, one or more primary objects and one or more secondary objects. The processor may designate each instance in the recording where one or more primary objects transitions to another object as a segment.

For example, a user may be watching a recording that is an anthology. The processor, before displaying the recording to the user may analyze the recording (or portions of the recording) and determine that there are five primary objects, e.g., main characters, in the recording and 100 secondary objects (e.g., trees, bikes, birds, etc.) in the recording. The processor may identify that the first 20 minutes of the recording focus on a first main character, and every subsequent 20 minutes focus on different main characters. The processor may designate these 20 minute intervals as segments.

It is noted that the processor could segment the recording into smaller segments, e.g., minute intervals, second intervals, etc. In such an instance, the processor could identify when a primary object transitions positions, locations, etc. Furthering the example above, the processor could identify the first main character and then identify each secondary object that surrounds the first main character and designate segments of the recording as when the secondary objects surrounding the first main character change (e.g., the first main character is around trees and then moves to a park bench, etc.).

In some embodiments, selecting the one or more primary objects may comprise receiving an input from a user. The input may include the user selecting the first primary object with a user-interactive selection tool that outlines the first primary object (as will be discussed further in regard to FIG. 2A). For example, a user may be viewing a tutorial on how to operate a certain piece of equipment. The tutorial may have multiple scenes, with each regarding a different aspect of the piece of equipment, however, the user may only be interested in a certain dial on the piece of equipment. The user may pause the tutorial and highlight the dial that is being presented by the tutorial. The processor running the tutorial may then skip all scenes not having the dial and/or discussing the dial, and/or, the processor may automatically begin preloading each scene with the dial at a higher bit rate than all other scenes without the dial (e.g., allowing for the tutorial to load/buffer more quickly and allowing the user to view the specific scenes with the dial without having to wait for the tutorial to load and/or for the quality of the tutorial to be watchable).

In some embodiments, selecting the one or more primary objects may comprise the processor accessing a database. The database may include information about each of the one or more objects. The processor may identify each of the one or more objects. The processor may tag each of the one or more objects with an indicator that indicates an identity of each of the one or more objects. The processor may determine, form the identity of each of the one or more objects, one or more relationships between each of the one or more objects. The processor may rank, based on the one or more relationships, each of the one or more objects.

For example, a computer may identify that a user is watching a cooking tutorial. The computer may analyze the tutorial and access a database (e.g., in the cloud, a part of the analyzation software, etc.) that includes information on cooking utensils. The computer may identify and tag a spatula, a pair of tongs, a skillet, an stove top, a chef, three eggs, breadcrumbs, and chicken legs. The computer may determine associations between all of the objects, e.g., the skillet is to be used on the stove top; the chef will be using the spatula, tongs, skillet, food; the eggs, breadcrumbs, and chicken legs will likely be used together and/or they are associated as "food," etc. The computer may determine from the number of associations (e.g., the chef is likely to handle each other object) and that because this is a cooking tutorial that the actions of the chef may be the most important for the user to follow, therefore the computer may rank the chef as the most important (e.g., primary) object in the tutorial. The computer may then rank the chicken as the second most important object as it will be handled the most by the chef (e.g., battered with eggs and breadcrumbs, then placed in the skillet, etc.). The computer may continue to rank each of the objects and depending on the rank of the object the computer may preload the object in segments of the tutorial at varying bit rates. That is, the chef is preloaded at a high bit rate and the lower ranked objects are preloaded at a lower bit rate than that of the chef's bit rate.

In some embodiments, the processor may identify a second primary object in the first segment of the recording. The processor may display the first segment of the recording to the user with the primary object at the first bit rate and the second primary object at a third bit rate. The third bit rate may be below the first bit rate and above the second bit rate.

Following the example above, the image of the chef in each segment that they appear in may be preloaded/streamed at 12 Mbps and the image of the chicken in each segment that they appear in may be preloaded/streamed at 8 Mbps and further objects may be preloaded/streamed at 4 Mbps. This allows the computer to more expeditiously stream/buffer the tutorial than having everything at 12 Mbps, which could delay the streaming of the video. It further guarantees that the user can see the techniques of the chef at all possible times.

In some embodiments, a subsequent segment may include both a primary object and a secondary object. In some embodiments, the processor may portion the subsequent segment into one or more portions. A first portion may include the primary object and a second portion may include the secondary object. The processor may display the first portion of the subsequent segment at the first bit rate. The processor may display, simultaneously, the second portion of the subsequent segment at the second bit rate.

For example, the processor may identify a car as the primary object of a recording, and a building as a secondary object. The car and the building may be in the same segment of the recording and since the user is most likely focusing on the car and/or most likely wants to only focus on the car, the processor may have the car streamed in a high quality (e.g., high resolution) and the building in a low quality (e.g., lower resolution than the car, blurring the building, etc.).

In some embodiments, the first bit rate may include displaying the primary object at a first resolution and the second bit rate may include displaying the secondary object at a second resolution. The first resolution may be higher than the second resolution. For example, the primary object may be streamed at 8 Mbps, which may equate to a resolution of 920 by 1080 px and the secondary object may be streamed at 5 Mbps, which may equate to a resolution of 1280 by 720 px.

Referring now to FIG. 1, illustrated is an example system 100 for automatically determining a bit rate to display segments of a recording to a user, in accordance with embodiments of the present disclosure. In some embodiments, the system 100 includes a user 102, a user preference tracker 104, an adaptive bit rate handler 106, an adaptive pixel correlator 108, a media streaming server 110, an internet cloud 112, a core network 114, a user interface 116, a network analyzer 118, and a media content database 120.

In some embodiments, the user 102 interacts with the user interface 116 in order to begin streaming a media/recording from the media streaming server 110, which pulls media content of the media/recording from the media content database 120. The media/recording is pulled/pushed from the media streaming server 110 via the internet cloud 112 and/or the core network 114. The core network 114 relays the media/recording to the user interface 116 for display to the user 102.

In some embodiments, the user preference tracker 104 tracks the users preferences and ranks what the user 102 would like to see most in the media/recording. For example, the user preference tracker 104 tracks the viewing habits of the user 102 for the last five media the user 102 has viewed and determines that the user fast-forwards to action scenes. In another example, the user 102 uses the user interface 116 to highlight an object of interest and the object is relayed to the user preference tracker 104 to be prioritized/ranked over other objects in the media. Following the preferences of the user 102, the user preference tracker 104 relays said preferences/information to the adaptive bit rate handler 106, which determines which bit rate to give each object/segment/scene of the media/recording. Following the example above, the adaptive bit rate handler 106 gives action scenes of the media/recording a higher bit rate than non-action scenes.

In some embodiments, the adaptive bit rate handler 106 additionally takes into account the network bandwidth, connectivity, and speed (e.g., upload/download speed) of the core network 114 as provided by the network analyzer 118 which tracks the core network 114 through the user interface 116. The adaptive bit rate handler 106 incorporates the information from the network analyzer 118 to further determine bit rates of the objects. For example, if the network is having connection issues, the adaptive bit rate handler 106 decreases the bit rate of the primary object in order to have it at least streamed, albeit not in the best quality (e.g., 8 Mbps, 1080p, etc.).

In some embodiments the adaptive bit rate handler 106 may relay the determined bit rates of the objects to the adaptive pixel correlator 108, which correlates the determined bit rates to resolutions. The adaptive pixel correlator 108 then relays the pixel determinations to the media streaming server 110 and the media streaming server 110 then pushes/relays the segments of the media/recording to the user interface 116 at the determined bit rates/resolutions. It is noted that the system 100 constantly analyzes the network speed, connectivity, bandwidth, etc. via the network analyzer 118 and will adjust the bit rates and the resolutions of the objects to higher quality if the network allows. Further, in some embodiments, if the user 102 indicates an affirmative user preference (e.g., highlighting, selecting, etc. an object of the media/recording), the system 100 will not increase the quality (e.g., bit rate, resolution, etc.) of the secondary objects. This will ensure that the user 102 is allowed to focus on their preferred object.

In some embodiments, media content is analyzed by a machine learning enabled object analyzer (not shown) that identifies all image objects from each video frame and records the contextual importance of all the images in that frame. For example, if Object 1, Object 2, and Object 3 are all in one video frame, the order of importance between the objects would be established for each frame like Object 3 being most important object followed by Object 1 and Object 2.

The object analyzer can also make a contextual relationship between the objects. For example, in any frame, Object 1, Object 2, and Object 3 are contextually related, and again Object 1, Object 5, Object 7 are contextually related to each other. That is, in one frame, Object 1 is a spoon, Object 2 is a fork, and Object 3 is a butter knife and the object analyzer determines the contextual relationship between Objects 1, 2, and 3 is that of "eating utensils." Further, in another frame, Object 1 is still the spoon, Object 4 is soup, Object 5 is a napkin, Object 6 is a salad, and Object 7 is a salad fork. The object analyzer further determines, since Object 1 is an "eating utensil" that Objects 5 and 7 should further be in that category because they are used for/while eating too, whereas Objects 4 and 6 are "eaten" or are designated as "food."

In some embodiments, the user preference tracker 104 learns the user preference set over time (e.g., based on historical data). Based on the preference/interest data, the object analyzer is able to map a user profile or users' profiles with image object associations. For example, the system 100 learns that User A likes to view cars whereas User C likes to view roadside sculptures, etc.

In some embodiments, the user preference tracker 104 allows user 102 to input/select the preferred objects in the frame. For Example, user 102 has the option to outline and select the desired object like a car or an actor from a recording frame. The user preference tracker 104 will send the user preference details to the object analyzer that will identify the user preferred objects in upcoming/subsequent frames.

The object analyzer feeds the analyzed output to the adaptive pixel correlator 108 that encodes the user selected objects/content in higher bit rate formats and image content of lesser importance (e.g. unselected objects/content) is encoded in lower bit rate formats along with the pixel correlation details based on the established order of importance (e.g., rank) between the objects (e.g., images, etc.).

When the user 102 attempts to view media content, the user preference tracker 104 from a client machine prompts the user 102 to provide the viewing preference details. The user 102 may respond that they are interested in streaming the video content based on bandwidth and/or to stream the video content dynamically based on contextual priority and personalization (e.g., from user input/selection).

Based on the user preference response, user preference tracker 104 notifies the adaptive bit rate handler 106, which also receives network speed details from the client system via network analyzer 118 and also predicts the bandwidth available for the user 102/for the system 100 in the future.

In some embodiments, if the user 102 prefers to stream the video content dynamically, the adaptive bit rate handler 106 initiates the preloading of ranked/selected (primary) objects of the video content based on network speed and the order of importance/rank established between the objects.

It is noted that apart from the current segment used to establish preferences/bandwidth/etc. (and perhaps a couple of upcoming/subsequent segments), the primary objects in the remaining future/subsequent video segments are delivered at the highest available bit rate format, whereas the remaining (secondary) objects are delivered at a reduced bit rate (e.g., based on optimal bit rate calculation). The adaptive pixel correlator 108 is notified to pass the remaining pixels, or pixels of a next set of primary objects, if the user 102 crosses the threshold segment (e.g., skips the segment that is preloaded) or if network speed changes (e.g., either high or low).

For example, if the user 102 is watching a ten minute video using a high speed network, the first 30 seconds are delivered in 1080p bit rate and only the primary objects in the next four to five minutes are preloaded in 1080p bit rate. Further, when the user 102 reaches the twentieth second, the media streaming server 110 then delivers pixels of/for the next set of primary objects and upgrades the thirtieth second to the fortieth second video segment from 360p bit rate to 720p bit rate. Still further, when the user 102 reaches the twenty-fifth second, the media streaming server 110 delivers the remaining pixels and upgrades the upcoming segment to 1080p.

In some embodiments, if the network speed is predicted (by the network analyzer 118) to be high, the user 102 views the entire frame in the desired resolution (e.g., the highest available quality 1080p, etc.). If network speed is predicted to be low then the user 102 views their preferred primary objects and/or contextually grouped primary objects in high resolution/bit rate and the other, secondary objects in a relatively low resolution/bit rate.

This provided system 100 and the accompanying method(s) ensure that the user preferred primary objects and the other objects that are contextually associated to the preferred primary objects are preloaded at a higher resolution so that any future bandwidth fluctuation does not affect the user viewing process/experience. Further, the proposed system 100 and accompanying method(s) reduce bandwidth consumption wastage in the case of when a viewer stops viewing the media content in-between, or jumps to, any of the future/subsequent frames of the recording/video. Further still, the system 100 and the accompanying method(s) ensure that the user 102 can streamline an entire recording and its associated media content in an appropriate bit rate based on network speed by providing and/or identifying user preferences.

Figure 2A:
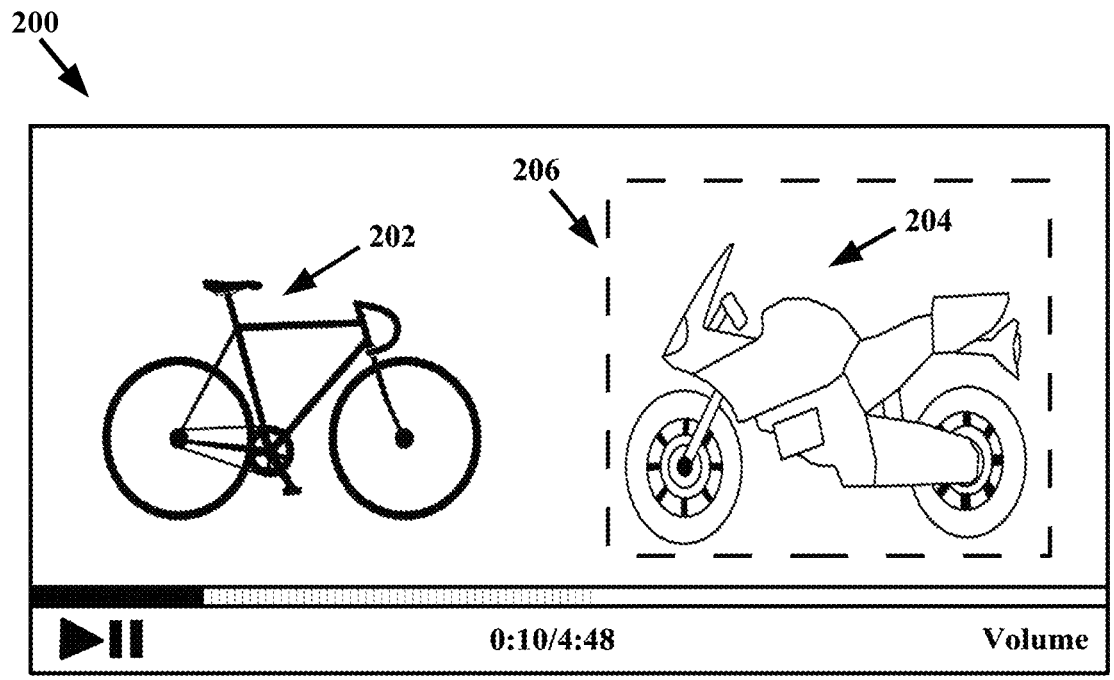
FIG. 2A depicts a representation of a media content window with a selected primary object during a first segment, in accordance with embodiments of the present disclosure.

Referring now to FIG. 2A, depicted is a representation of a media content window 200 with a selected primary object 204 during a first segment, in accordance with embodiments of the present disclosure. In some embodiments, a user begins viewing a recording via a video streaming service on the media content window 200. The video depicted is a recording comparing a motorized bicycle 202 to a motorcycle 204. As depicted, the motorized bicycle 202 and the motorcycle 204 are displayed to the user at the same time during a first 10 second segment.

In some embodiments, the user selects (or is prompted to select) which object they are most interest in viewing while the video is playing. As depicted, the user using a user-interactive outline tool or any other indicator tool (e.g., both not shown) draws an outline 206 around their preferred object, the motorcycle 204. The outline 206 indicates to the system (e.g., the system 100 of FIG. 1) that the motorcycle 204 is a primary object and that every subsequent segment with the motorcycle 204 should be preloaded with the motorcycle 204 at a higher bit rate than the other objects (e.g., the motorized bicycle 202) in the media content window 200.

Figure 2B:
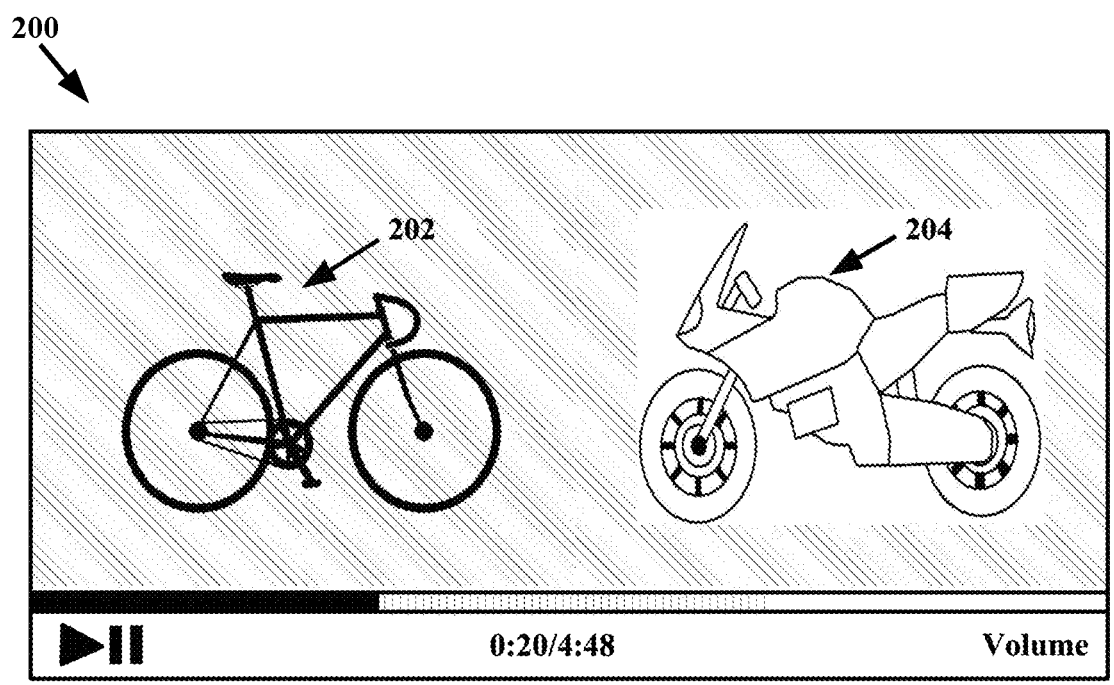
FIG. 2B depicts a representation of the media content widow of the selected primary object during a second segment, in accordance with embodiments of the present disclosure.

Referring now to FIG. 2B, depicted is a representation of the media content widow 200 of the selected primary object 204 during a second segment, in accordance with embodiments of the present disclosure. It is noted that like reference numerals are used to designate like parts in the accompanying drawings. As shown, after the user outlines the motorcycle 204 with the outline 206 (as depicted in FIG. 2A), the subsequent segment of the video, (as depicted at the 20 second mark of FIG. 2B, where the first 10 seconds of the recording being the first segment and seconds 10-20 being the second/subsequent segment), includes a high quality (e.g., bit rate, resolution, etc.) imaged version of the motorcycle 204 as it was preloaded at a higher quality and the secondary objects (e.g., the background and the motorized bicycle 202) are included at a lower quality than the motorcycle 204.

It is noted, that the amount of memory required to download an image/video depends primarily on the resolution of the image/image(s) in the video and the color depth used per pixel. The formulas to calculate required bandwidth at a given resolution and bit depth for an image and a video are as follows:

Bandwidth required for image= ($X_{Resolution}$*$Y_{Resolution}$*Bits-Per-Pixel).

Bandwidth required for video (per second)= ($X_{Resolution}$*$Y_{Resolution}$*Bits-Per-Pixel*Number of Frames per Second).

Further noted, is that the system cannot always preload the pixels at the lowest bit rate possible as remaining pixels should be downloaded when that segment/frame is about to be played/delivered. Thus the preload bit rate/percentage should be calculated based on the bandwidth of the internet connection.

Therefore, as described by the FIGS. and method(s) provide in this disclosure, optimal bit rate calculation is performed to ensure that the required amount of pixels are preloaded in such a way that bandwidth is available to download the remaining pixels and to deliver the final media content in the viewer-expected high bit rate. That is, the motorcycle 204, once selected/determined to be a primary object, will always be preloaded at the high bit rate and the secondary objects, e.g., the motorized bicycle 202 will always be preloaded at a lower bit rate than the motorcycle 202, but if allowed (e.g., if there is enough bandwidth and/or remaining pixels) when the segment is going to be displayed to/played for a user, the secondary objects can be downloaded/delivered at the high bit rate.

That is, if the network speed is predicted to be high (e.g., can handle a high bit rate for all primary and secondary objects), a user would view the entire segment/frame in a desired high resolution. If network speed is predicted to be low then the user would enjoy their primary/preferred objects and/or contextually grouped important objects in high resolution and other secondary objects in a relatively low resolution, comparatively.

The system/method(s) depicted in the FIGS. ensure that the user preferred primary objects and other objects that are/can be contextually associated to the preferred primary objects are preloaded at a higher bit rate/resolution so that any future bandwidth fluctuation does not affect the user viewing experience.

Figure 3:
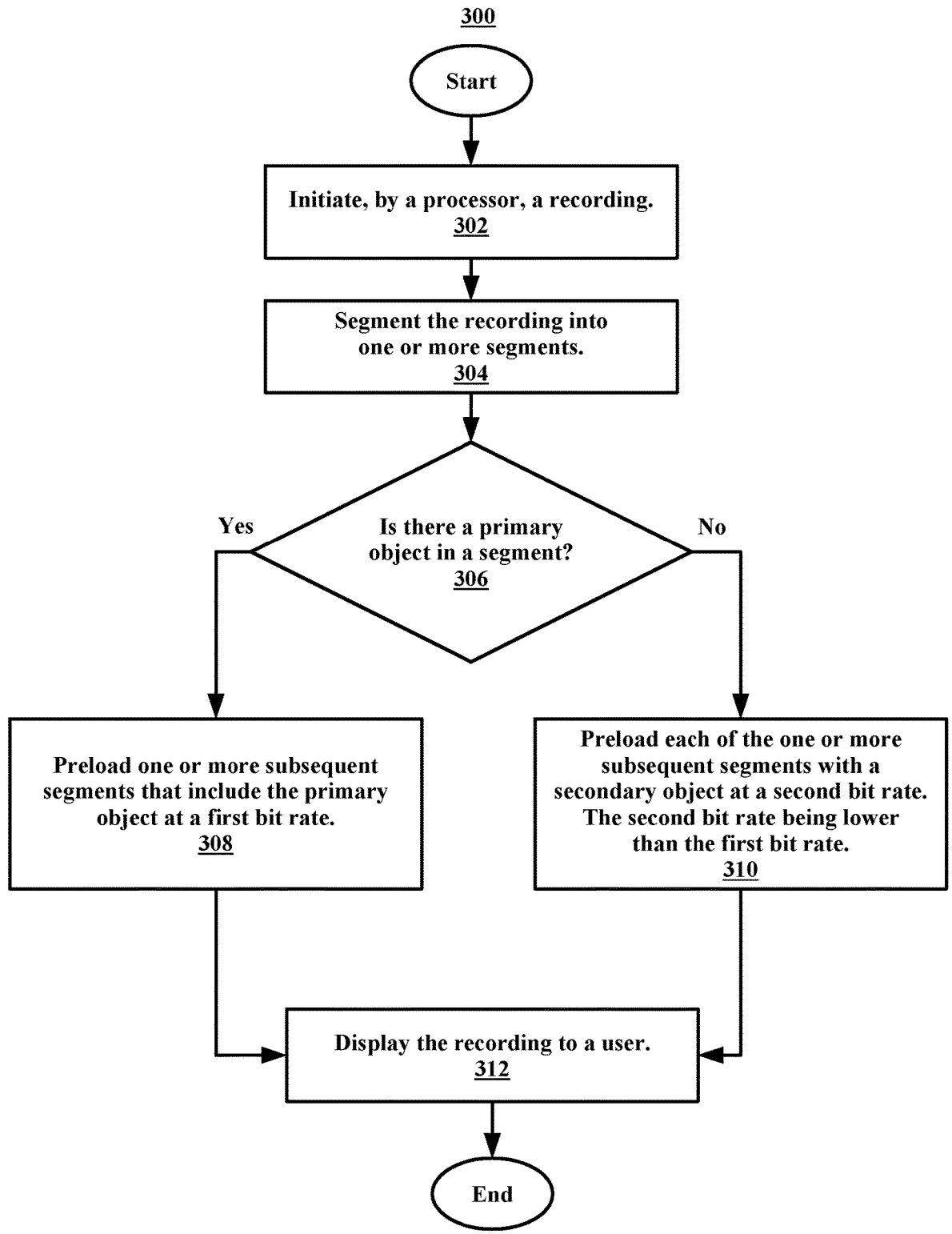
FIG. 3 illustrates a flowchart of an example method for automatically determining a bit rate to display segments of a medium to a user, in accordance with embodiments of the present disclosure.

Referring now to FIG. 3, illustrated is a flowchart of an example method 300 for automatically determining a bit rate to display segments of a medium to a user, in accordance with embodiments of the present disclosure. In some embodiments, the method 300 may be performed by a processor and/or any device that can implement the use of a processor (e.g., a server, a computer, a tablet, etc.).

In some embodiments, the method 300 begins at operation 302 where the processor initiates a recording. The method 300 proceeds to operation 304. At operation 304 the processor segments the recording into one or more segments (e.g., frames, scenes, time-intervals, etc.).

The method 300 proceeds to decision block 306 were it is determined if there is a primary object in a segment (or part of a segment). If, at decision block 306, it is determined that there is a primary object in a segment, the method 300 proceeds to operation 308. At operation 308, the processor preloads one or more subsequent segments that include the primary object at a first bit rate (e.g., a high bit rate, a high resolution, etc.).

If, at decision block 306, it is determined that there is not a primary object in a segment, the method 300 proceeds to operation 310. In some embodiments, the method 300 proceeds simultaneously from decision block 306 to operations 308 and 310 (e.g., when there is both a primary object and secondary objects in the same segment). At operation 310, the processor preloads each of the one or more subsequent segments with a secondary object at a second bit rate. The second bit rate is lower than the first bit rate.

The method 300 proceeds to operation 312 where the processor displays the recording to a user. In some embodiments, the recording is displayed to the user a segment at a time and each segment includes the determined bit rate of the primary and secondary objects. In some embodiments, each segment of the recording is displayed until each segment or desired segment (e.g., the user skips scenes, etc.) of the recording is displayed to the user and the recording has no more segments to display. In some embodiments, after operation 312, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
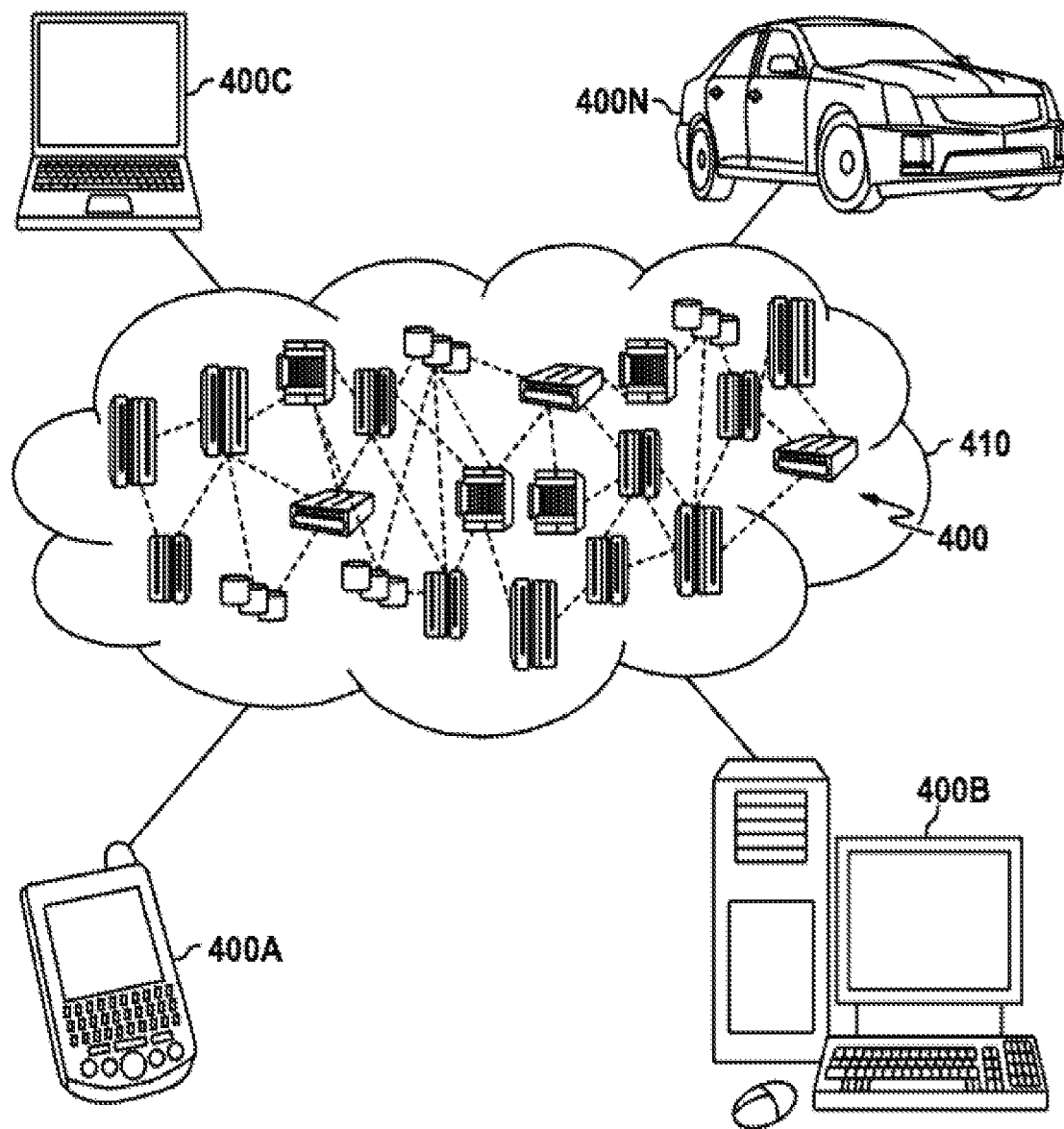
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
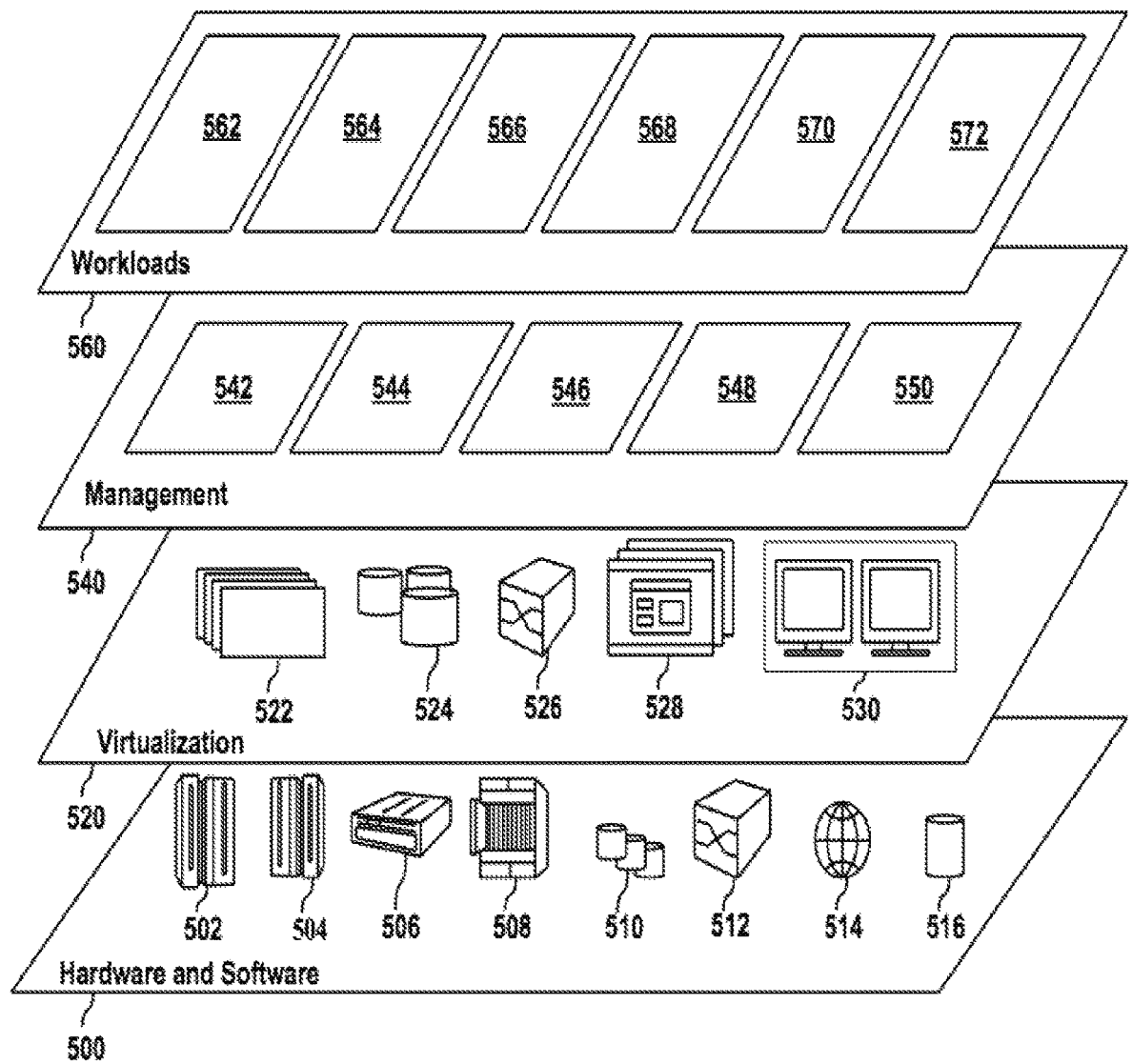
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and adaptive bit rate/resolution processing 572.

Figure 6:
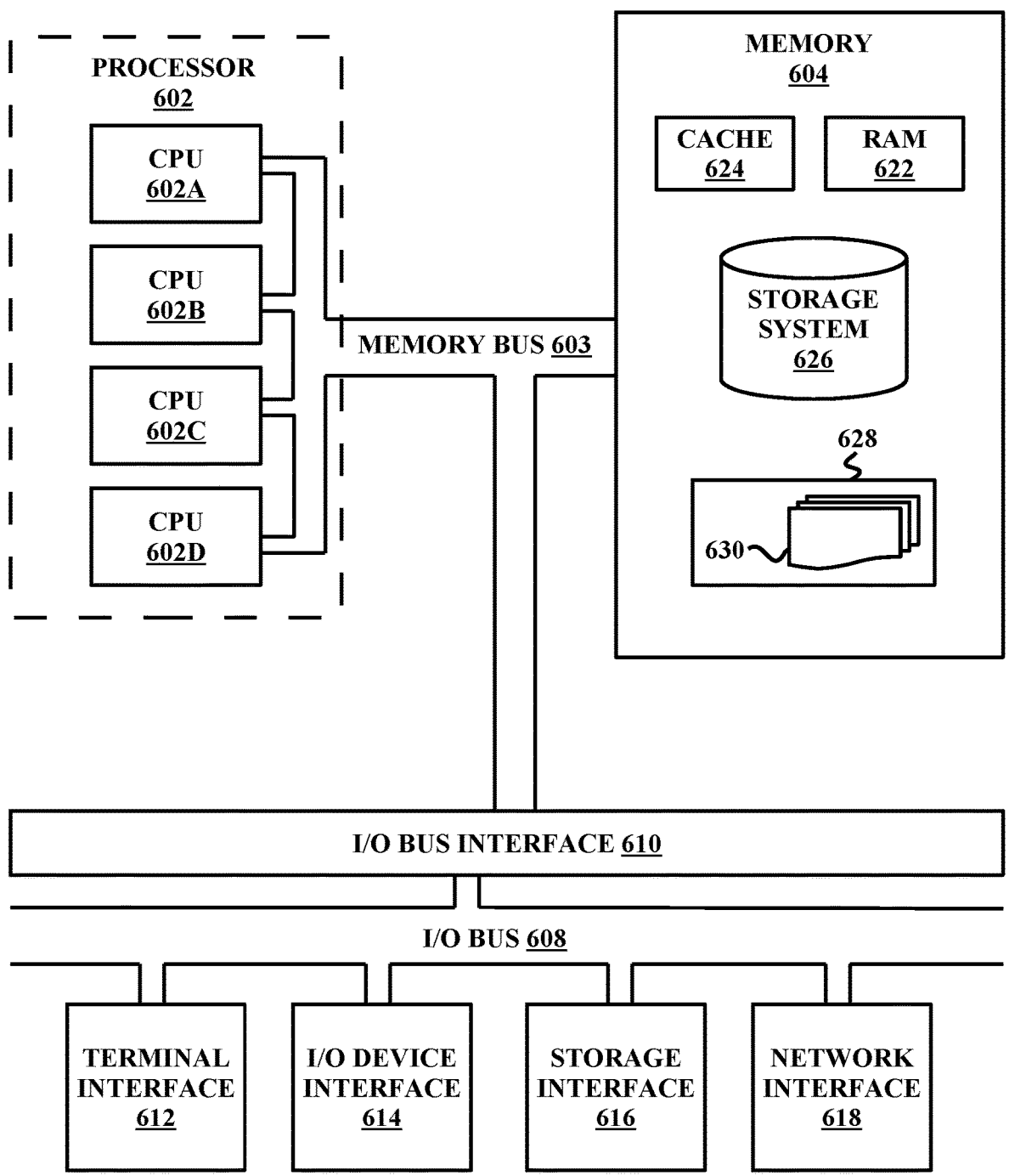
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD®-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD®), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
initiating, by a processor, a recording having a plurality of segments;
determining a network does not have sufficient bandwidth to preload the recording;
analyzing, responsive to the determining the network does not have sufficient bandwidth, the recording to identify two or more objects in the recording, wherein the two or more objects includes a primary object and a secondary object based, at least in part, on user interest;
identifying a first segment, of the plurality of segments of the recording, associated with the primary object;
determining, based on the identification of the primary object associated with the first segment, a first bit rate for the first segment of the recording;
automatically preloading one or more subsequent segments of the plurality of segments that include the primary object at the first bit rate;
automatically preloading each of the one or more subsequent segments with the secondary object at a second bit rate, wherein the second bit rate is lower than the first bit rate;
displaying the one or more subsequent segments associated with the primary object to a user; and
skipping the one or more subsequent segments associated with the secondary object.

2. The method of claim 1, further comprises:
identifying, from the analyzing, two or more objects in the recording;
selecting from the two or more objects, one or more primary objects and one or more secondary objects;
designating each instance in the recording where one primary object transitions to another primary object as a segment; and
receiving an input from the user, wherein the input includes the user selecting the first primary object with a user-interactive selection tool that outlines the first primary object.

3. The method of claim 1, further comprises:
identifying, from the analyzing, two or more objects in the recording;
selecting from the two or more objects, one or more primary objects and one or more secondary objects;
designating each instance in the recording where one primary object transitions to another primary object as a segment;
accessing a database, wherein the database includes information about each of the one or more objects;
identifying each of the one or more objects;
tagging each of the one or more objects with an indicator that indicates an identity of each of the one or more objects;
determining, from the identity of each of the one or more objects, one or more relationships between each of the one or more objects; and
ranking, based on the one or more relationships, each of the one or more objects.

4. The method of claim 1, further comprising:
identifying, from the analyzing, two or more objects in the recording;
selecting from the two or more objects, one or more primary objects and one or more secondary objects;
designating each instance in the recording where one primary object transitions to another primary object as a segment;
identifying a second primary object in the first segment of the recording; and
displaying the first segment of the recording to the user with the primary object at the first bit rate and the second primary object at a third bite rate, wherein the third bit rate is below the first bit rate and above the second bit rate.

5. The method of claim 1, wherein a subsequent segment includes both the primary object and the secondary object, and wherein the method further comprises:
portioning the subsequent segment into one or more portions, wherein a first portion includes the primary object and a second portion includes the secondary object;
displaying the first portion of the subsequent segment at the first bit rate; and
displaying, simultaneously, the second portion of the subsequent segment at the second bit rate.

6. The method of claim 1, wherein the first bit rate includes displaying the primary object at a first resolution and the second bit rate includes displaying the secondary object at a second resolution, wherein the first resolution is higher than the second resolution.

7. A system comprising:
a memory; and
a processor in communication with the memory, the processor executing instructions contained within the memory in order to perform operations comprising:
initiating, by a processor, a recording having a plurality of segments;
determining a network does not have sufficient bandwidth to preload the recording;
analyzing, responsive to the determining the network does not have sufficient bandwidth, the recording to identify two or more objects in the recording, wherein the two or more objects includes a primary object and a secondary object based, at least in part, on user interest;
identifying a first segment, of the plurality of segments of the recording, associated with the primary object;
determining, based on the identification of the primary object associated with the first segment, a first bit rate for the first segment of the recording;
automatically preloading one or more subsequent segments of the plurality of segments that include the primary object at the first bit rate;
automatically preloading each of the one or more subsequent segments with the secondary object at a second bit rate, wherein the second bit rate is lower than the first bit rate;
displaying the one or more subsequent segments associated with the primary object to a user; and
skipping the one or more subsequent segments associated with the secondary object.

8. The system of claim 7, further comprises:
identifying, from the analyzing, two or more objects in the recording;
selecting from the two or more objects, one or more primary objects and one or more secondary objects;
designating each instance in the recording where one primary object transitions to another primary object as a segment; and
receiving an input from the user, wherein the input includes the user selecting the first primary object with a user-interactive selection tool that outlines the first primary object.

9. The system of claim 7, wherein the operations further comprises:
  identifying, from the analyzing, two or more objects in the recording;
  selecting from the two or more objects, one or more primary objects and one or more secondary objects;
  designating each instance in the recording where one primary object transitions to another primary object as a segment;
  accessing a database, wherein the database includes information about each of the one or more objects;
  identifying each of the one or more objects;
  tagging each of the one or more objects with an indicator that indicates an identity of each of the one or more objects;
  determining, from the identity of each of the one or more objects, one or more relationships between each of the one or more objects; and
  ranking, based on the one or more relationships, each of the one or more objects.

10. The system of claim 7, wherein the operations further comprise:
  identifying, from the analyzing, two or more objects in the recording;
  selecting from the two or more objects, one or more primary objects and one or more secondary objects;
  designating each instance in the recording where one primary object transitions to another primary object as a segment;
  identifying a second primary object in the first segment of the recording; and
  displaying the first segment of the recording to the user with the primary object at the first bit rate and the second primary object at a third bite rate, wherein the third bit rate is below the first bit rate and above the second bit rate.

11. The system of claim 7, wherein a subsequent segment includes both the primary object and the secondary object, and wherein the operations further comprise:
  portioning the subsequent segment into one or more portions, wherein a first portion includes the primary object and a second portion includes the secondary object;
  displaying the first portion of the subsequent segment at the first bit rate; and
  displaying, simultaneously, the second portion of the subsequent segment at the second bit rate.

12. The system of claim 7, wherein the first bit rate includes displaying the primary object at a first resolution and the second bit rate includes displaying the secondary object at a second resolution, wherein the first resolution is higher than the second resolution.

13. A computer program product comprising a computer readable storage medium having program instructions embodied therewith, the program instructions executable by a processor to cause the processor to perform a method, the method comprising:
  initiating, by a processor, a recording having a plurality of segments;
  determining a network does not have sufficient bandwidth to preload the recording;
  analyzing, responsive to the determining the network does not have sufficient bandwidth, the recording to identify two or more objects in the recording, wherein the two or more objects includes a primary object and a secondary object based, at least in part, on user interest;
  identifying a first segment, of the plurality of segments of the recording, associated with the primary object;
  determining, based on the identification of the primary object associated with the first segment, a first bit rate for the first segment of the recording;
  automatically preloading one or more subsequent segments of the plurality of segments that include the primary object at the first bit rate;
  automatically preloading each of the one or more subsequent segments with the secondary object at a second bit rate, wherein the second bit rate is lower than the first bit rate;
  displaying the one or more subsequent segments associated with the primary object to a user; and
  skipping the one or more subsequent segments associated with the secondary object.

14. The computer program product of claim 13, wherein the method further comprises:
  identifying, from the analyzing, two or more objects in the recording;
  selecting from the two or more objects, one or more primary objects and one or more secondary objects;
  designating each instance in the recording where one primary object transitions to another primary object as a segment; and
  receiving an input from the user, wherein the input includes the user selecting the first primary object with a user-interactive selection tool that outlines the first primary object.

15. The computer program product of claim 13, wherein the method further comprises:
  identifying, from the analyzing, two or more objects in the recording;
  selecting from the two or more objects, one or more primary objects and one or more secondary objects;
  designating each instance in the recording where one primary object transitions to another primary object as a segment;
  accessing a database, wherein the database includes information about each of the one or more objects;
  identifying each of the one or more objects;
  tagging each of the one or more objects with an indicator that indicates an identity of each of the one or more objects;
  determining, from the identity of each of the one or more objects, one or more relationships between each of the one or more objects; and
  ranking, based on the one or more relationships, each of the one or more objects.

16. The computer program product of claim 13, wherein the method further comprises:
  identifying, from the analyzing, two or more objects in the recording;
  selecting from the two or more objects, one or more primary objects and one or more secondary objects;
  designating each instance in the recording where one primary object transitions to another primary object as a segment;
  identifying a second primary object in the first segment of the recording; and
  displaying the first segment of the recording to the user with the primary object at the first bit rate and the second primary object at a third bite rate, wherein the third bit rate is below the first bit rate and above the second bit rate.

17. The computer program product of claim 13, wherein a subsequent segment includes both the primary object and the secondary object, and wherein the method further comprises:
- portioning the subsequent segment into one or more portions, wherein a first portion includes the primary object and a second portion includes the secondary object;
- displaying the first portion of the subsequent segment at the first bit rate; and
- displaying, simultaneously, the second portion of the subsequent segment at the second bit rate.

\* \* \* \* \*